J. McGUIRE.
HEATING APPARATUS.
APPLICATION FILED AUG. 30, 1911. RENEWED APR. 20, 1914.
1,098,950.
Patented June 2, 1914.
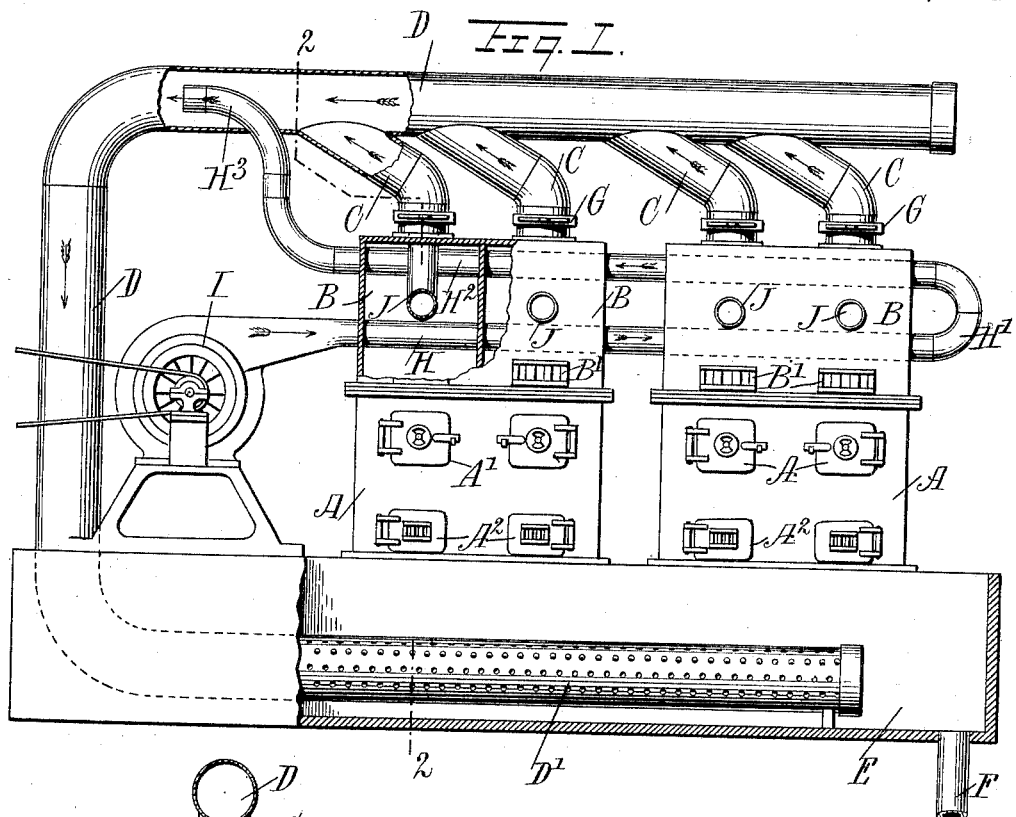
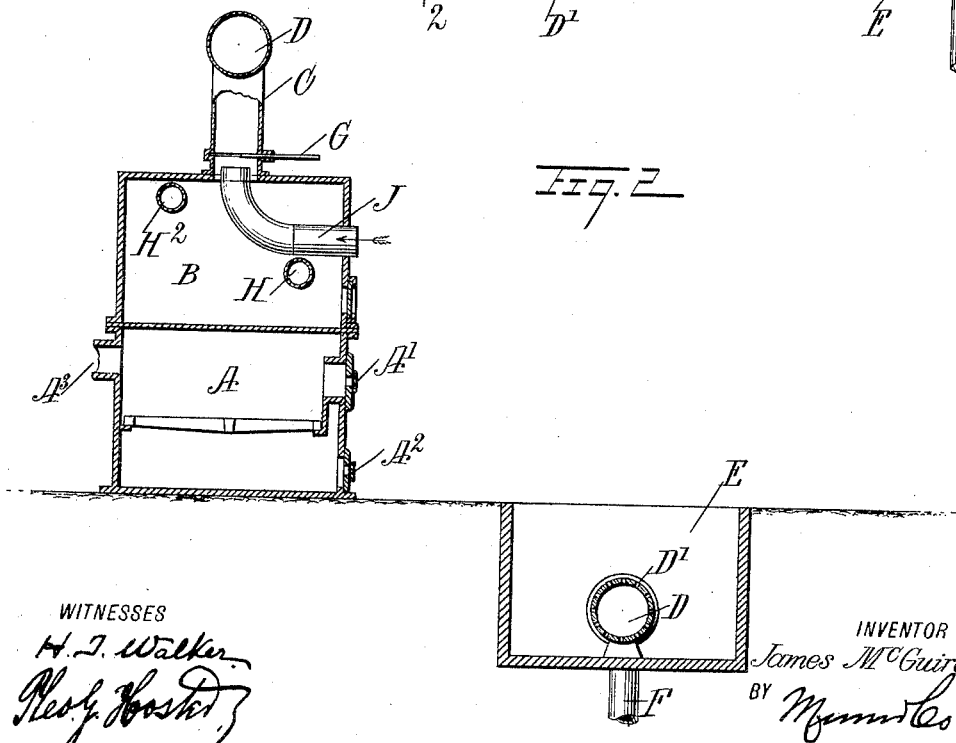
WITNESSES
H. J. Walker
INVENTOR
James McGuire
BY
ATTORNEYS

UNITED STATES PATENT OFFICE.

JAMES McGUIRE, OF SAVANNAH, GEORGIA.

HEATING APPARATUS.

1,098,950.  Specification of Letters Patent.  Patented June 2, 1914.

Application filed August 30, 1911, Serial No. 646,773. Renewed April 20, 1914. Serial No. 833,307.

*To all whom it may concern:*

Be it known that I, JAMES McGUIRE, a citizen of the United States, and a resident of Savannah, in the county of Chatham and State of Georgia, have invented a new and Improved Heating Apparatus, of which the following is a full, clear, and exact description.

The invention relates to hot air heating systems, and its object is to provide a new and improved heating apparatus for melting snow and for heating dwellings, stores, office building, greenhouses, lime kilns and other structures, and arranged to utilize the fuel to the fullest advantage and to highly heat the air in a comparatively short time.

For the purpose mentioned, use is made of a furnace provided with one or more heating chambers connected by connecting pipes with a delivery flue for delivering the heated air to the desired place, and a draft pipe passing through the heating chambers and extending into said delivery flue to produce a suction therein and consequently in the air heating chambers to draw the heated air out of the same and into the delivery flue.

A practical embodiment of the invention is represented in the accompanying drawings forming a part of this specification, in which similar characters of reference indicate corresponding parts in both views.

Figure 1 is a side elevation of the heating apparatus, parts being shown in section; and Fig. 2 is a transverse section of the same, on the line 2—2 of Fig. 1.

One, two or more single or double furnaces A have a corresponding number of heating chambers B provided with valved air inlets B' for controlling the air passing into the chambers B to be heated. The top of each air-heating chamber B is connected by a connecting pipe C with the closed end of a delivery flue D extending to the place where the heat is to be delivered; for instance, as shown in the drawings, the perforate end D' of the delivery flue D extends into a box or a hopper E for containing snow to be melted by the heated air passing out through the perforations in the end D'. The bottom of the box E is provided with a pipe F for carrying off the snow water. Each of the connecting pipes C is provided with a damper G for controlling the amount of heated air passing from a heating chamber B by way of the connecting pipe C into the delivery flue D.

A draft pipe H extends through the several heating chambers B at or near the front thereof, and the draft pipe H is provided outside of the last heating chamber with a return bend H' leading to a draft pipe section $H^2$, also passing through the several air heating chambers B at or near the rear thereof (see Fig. 2), the terminal $H^3$ of the draft pipe H finally extending into the delivery flue D in the direction in which the air is to be forced through the delivery flue D to the perforate end D'. The entrance end of the draft flue H is connected with a fan or a blower I for forcing air through the draft pipe H, it being understood that the air is heated during its passage through the draft pipe owing to the latter extending through the air-heating chambers B, and consequently the heated air passes out of the terminal $H^3$ into the delivery flue D to produce a suction therein, with a view to draw the heated air out of the air-heating chambers B by way of the connecting pipes C, all the heated air finally passing through the delivery flue D to the desired place to be heated with hot air. In case the delivery flue D extends upward from a point adjacent the terminal $H^3$, then the fan or blower I can be dispensed with, as the natural draft through the pipe H is sufficient to produce a suction action in the delivery flue D.

A supplementary short draft pipe J is arranged in each heating chamber B, one end of the pipe J extending to the outside and the other end extending into the entrance end of the corresponding connecting pipe C. Now atmospheric air passing through the pipe J is heated by contact with the heated pipe J, and the heated air passes centrally into the corresponding connecting pipe C to produce a suction therein and thus aid in drawing the heated air out of the chamber B into the connecting pipe C.

The furnaces A may be of any approved construction for burning any desired fuel, such as wood, coal, oil or the like, it being understood that the furnaces are provided with suitable doors A' and $A^2$ for the introduction of the fuel or removal of the ashes.

In case oil is used as a fuel, the bottoms of the heating chambers are provided with minute holes.

Having thus described my invention, I claim as new and desire to secure by Letters Patent:

1. A heating apparatus, comprising a furnace, an air heating chamber heated from the said furnace and provided with an air inlet, a delivery flue for conducting the heated air to the place to be heated, a connecting pipe connecting the said air-heating chamber with the said delivery flue, a main draft pipe extending through the said air-heating chamber and passing into the said delivery flue to produce a suction therein and thus draw the air from the air-heating chamber, and a supplementary draft flue extending through the air-heating chamber and extending at one end to the outside of the heating chamber and at the other into the said connecting pipe.

2. A heating apparatus, comprising a furnace, an air-heating chamber heated from the said furnace and provided with an air inlet, a delivery flue for conducting the heated air to the place to be heated, a connecting pipe connecting the said air-heating chamber with the said delivery flue, a main draft pipe extending through the said air-heating chamber and passing into the said delivery flue to produce a suction therein and thus draw the air from the air-heating chamber, a supplementary draft flue extending through the air-heating chamber and extending at one end to the outside of the heating chamber and at the other into the said connecting pipe, and a fan connected with the inlet end of the said main draft pipe.

3. A heating apparatus, comprising a plurality of furnaces, a plurality of air-heating chambers heated by the said furnaces, a delivery flue having one end closed and the other end perforated, connecting pipes connecting the heating chambers with the closed end of the said delivery flue, a draft pipe open at one end to the atmosphere and extending through the said heating chambers, the terminal of the said main draft pipe extending centrally into the said delivery flue in advance of the said connecting pipes, and an air forcing device connected with the draft pipe.

4. A heating apparatus, comprising a plurality of furnaces, a plurality of air-heating chambers heated by the said furnaces, a delivery flue having one end closed and the other end perforated, connecting pipes connecting the heating chambers with the closed end of the said delivery flue, a main draft pipe open at one end to the atmosphere and extending through the said heating chambers, the terminal of the said main draft pipe extending centrally into the said delivery flue in advance of the said connecting pipes, and short supplementary draft pipes extending through the air-heating chambers, one end of each supplementary draft pipe being open to the atmosphere and the other end opening centrally into the entrance end of the corresponding connecting pipe.

5. A heating apparatus, comprising a plurality of furnaces, a plurality of air-heating chambers heated by the said furnaces, a delivery flue having one end closed and the other end perforated, connecting pipes connecting the heating chambers with the said closed end of the said delivery flue, a main draft pipe open at one end to the atmosphere and extending through the said heating chambers, the terminal of the said draft pipe extending centrally into the said delivery flue in advance of the said connecting pipes, short supplementary draft pipes extending through the air-heating chambers, one end of each supplementary draft pipe being open to the atmosphere and the other end opening centrally into the entrance end of the corresponding connecting pipe, and a fan connected with the entrance end of the said main draft pipe.

6. A heating apparatus, comprising a plurality of furnaces, a plurality of heating chambers heated by said furnaces, a delivery flue having one end closed, a pipe connecting each heating chamber with the closed end of the delivery flue, a main draft pipe extending through the front portions of the several heating chambers and then through the rear portions of the said chambers and having its terminal extending into the draft flue in advance of the pipes connecting the heating chambers with said flue, a fan connected with the entrance end of the draft pipe, and an auxiliary draft pipe leading through the front of each chamber into the pipe connecting the chamber with the delivery flue, the outer end of the said pipe being open to the atmosphere.

In testimony whereof I have signed my name to this specification in the presence of two subscribing witnesses.

JAMES McGUIRE.

Witnesses:
T. J. NAUGHTON,
B. W. TEADER, Jr.

---

Copies of this patent may be obtained for five cents each, by addressing the "Commissioner of Patents, Washington, D. C."